(12) United States Patent
Roh et al.

(10) Patent No.: US 12,506,977 B2
(45) Date of Patent: Dec. 23, 2025

(54) IMAGE SENSOR WITH MULTIPLE EXPOSURE TIMES

(71) Applicant: SAMSUNG ELECTRONICS CO., LTD., Suwon-si (KR)

(72) Inventors: Younghun Roh, Suwon-si (KR); Juhyun Ko, Suwon-si (KR); Jiyeon Woo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/202,609

(22) Filed: May 26, 2023

(65) Prior Publication Data

US 2023/0319430 A1 Oct. 5, 2023

Related U.S. Application Data

(63) Continuation of application No. 16/685,361, filed on Nov. 15, 2019, now Pat. No. 11,678,075.

(30) Foreign Application Priority Data

Mar. 25, 2019 (KR) .......................... 10-2019-0033727

(51) Int. Cl.
*H04N 25/46* (2023.01)
*H04N 23/10* (2023.01)
*H04N 25/78* (2023.01)
*H04N 25/59* (2023.01)
(Continued)

(52) U.S. Cl.
CPC ............. *H04N 25/46* (2023.01); *H04N 23/10* (2023.01); *H04N 25/78* (2023.01); *H04N 25/59* (2023.01); *H04N 25/704* (2023.01); *H04N 25/77* (2023.01)

(58) Field of Classification Search
CPC ........ H04N 23/10; H04N 25/13; H04N 25/46; H04N 25/583; H04N 25/585; H04N 25/59; H04N 25/704; H04N 25/77; H04N 25/778; H04N 25/78

See application file for complete search history.

(56) References Cited

U.S. PATENT DOCUMENTS

| 7,745,779 B2 | 6/2010 | Conners |
| 8,525,906 B2 | 9/2013 | Ui |
| 8,922,685 B2 | 12/2014 | Nakata et al. |

(Continued)

FOREIGN PATENT DOCUMENTS

| CN | 101556962 A | 10/2009 |
| CN | 104780321 A | 7/2015 |

(Continued)

OTHER PUBLICATIONS

Korean Office Action dated Sep. 5, 2023, of the corresponding KR Patent Application No. 10-2019-0033727.

(Continued)

*Primary Examiner* — Antoinette T Spinks
(74) *Attorney, Agent, or Firm* — Muir Patent Law, PLLC

(57) ABSTRACT

An image sensor includes a pixel array, wherein the pixel array includes a first unit pixel including first sensing pixels adjacent along a column direction and second sensing pixels adjacent along the column direction, the first sensing pixels and the second sensing pixels being adjacent along a row direction, and a same color filter overlapping first and second sensing pixels. The first sensing pixels share a first floating diffusion node, and the second sensing pixels share a second floating diffusion node.

10 Claims, 21 Drawing Sheets

(51) Int. Cl.
*H04N 25/704* (2023.01)
*H04N 25/77* (2023.01)

(56) References Cited

U.S. PATENT DOCUMENTS

| | | |
|---|---|---|
| 8,964,079 B2 | 2/2015 | Fukuda et al. |
| 9,237,281 B2 | 1/2016 | Fukuda |
| 9,338,378 B2 | 5/2016 | Sugawa |
| 9,357,137 B2 | 5/2016 | Mitsunaga |
| 9,749,556 B2 | 8/2017 | Fettig et al. |
| 10,015,428 B2 | 7/2018 | Lee et al. |
| 10,547,800 B2 | 1/2020 | Hwang et al. |
| 2013/0327950 A1 | 12/2013 | Niwa et al. |
| 2016/0286108 A1 | 9/2016 | Fettig et al. |
| 2017/0013217 A1 | 1/2017 | Lee et al. |
| 2017/0339353 A1 | 11/2017 | Banachowicz et al. |
| 2018/0242827 A1 | 8/2018 | Michihata |
| 2018/0352199 A1 | 12/2018 | Hwang et al. |
| 2019/0394379 A1 | 12/2019 | Segapelli et al. |

FOREIGN PATENT DOCUMENTS

| | | |
|---|---|---|
| CN | 108933907 A | 6/2022 |
| JP | 2006-080937 A | 3/2006 |
| KR | 1020130139182 A | 12/2013 |
| KR | 10-2015-0124367 A | 11/2015 |
| KR | 1020170006206 B1 | 1/2022 |

OTHER PUBLICATIONS

First Office Action dated Dec. 11, 2023 for corresponding CN Patent Application No. 202010190218.3.
Notice of Allowance dated May 27, 2024 for corresponding KR Patent Application No. 10-2019-0033727.
Second Office Action dated Jun. 5, 2024 for corresponding application CN Patent Application No. 202010190218.3.

FIG. 3
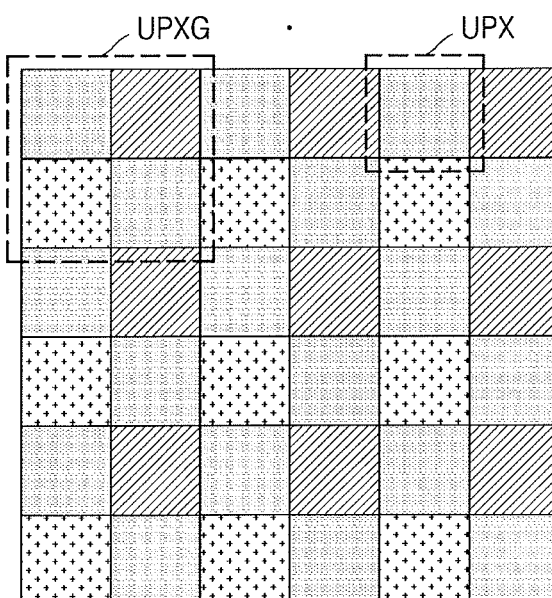
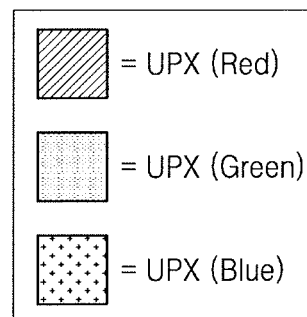

FIG. 5C
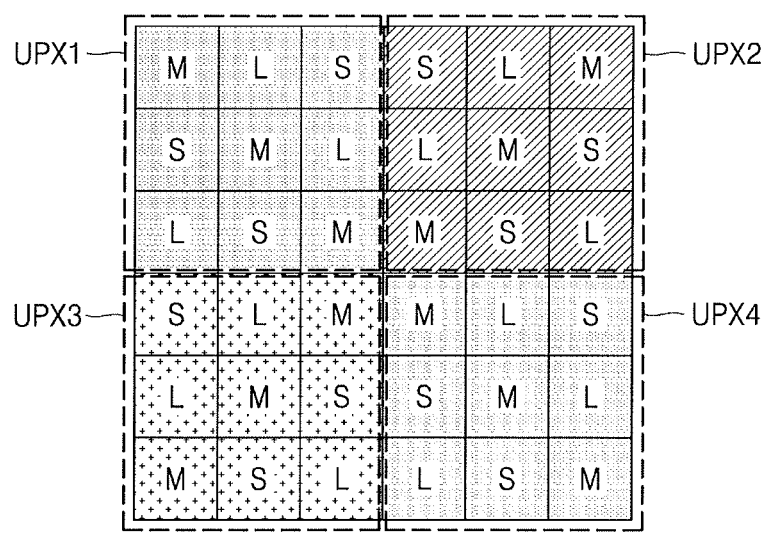
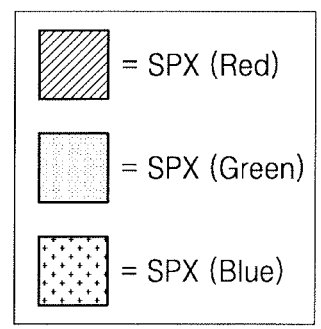

FIG. 5D
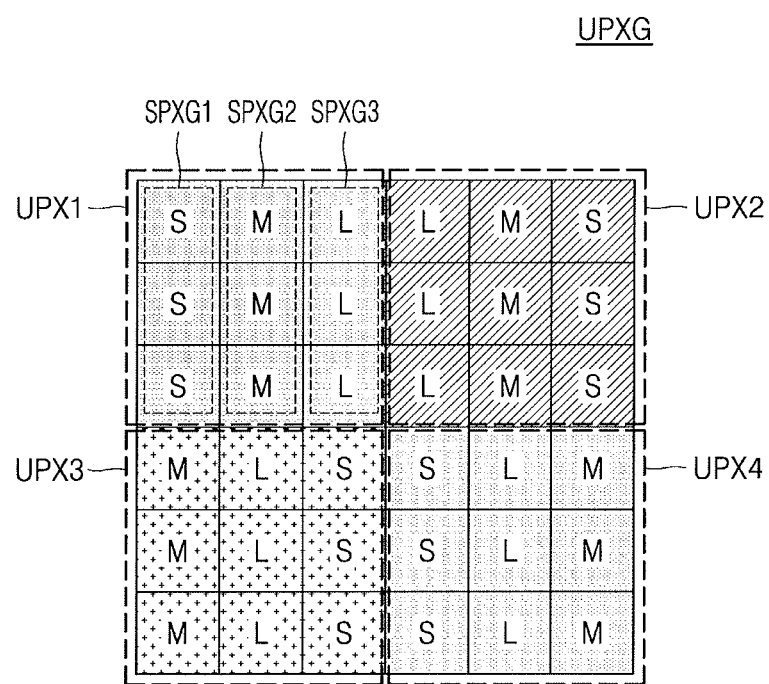
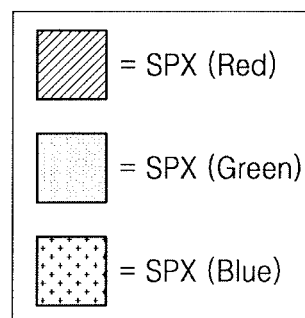

FIG. 13A
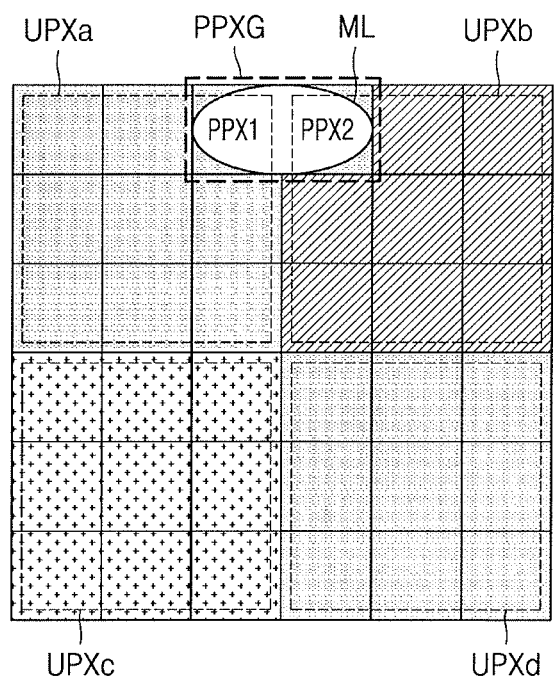
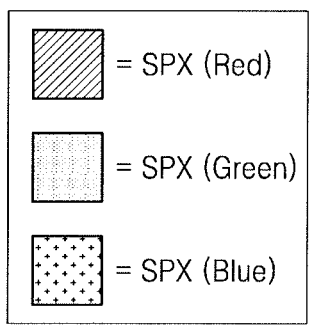

FIG. 13C
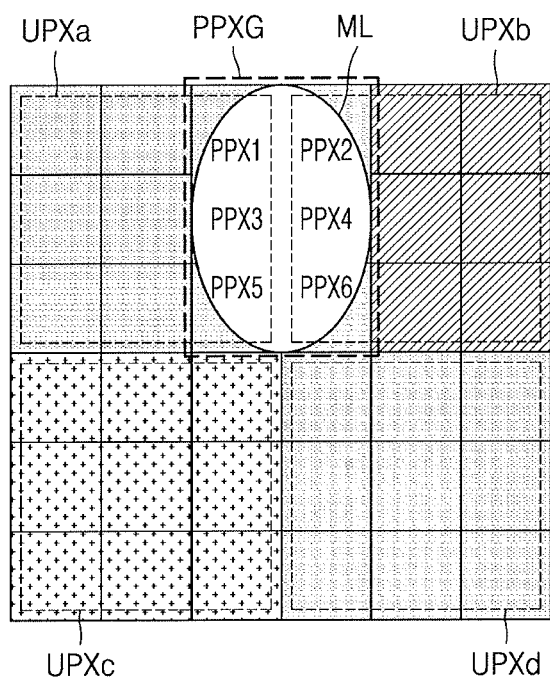
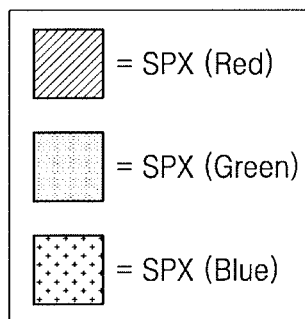

FIG. 13D
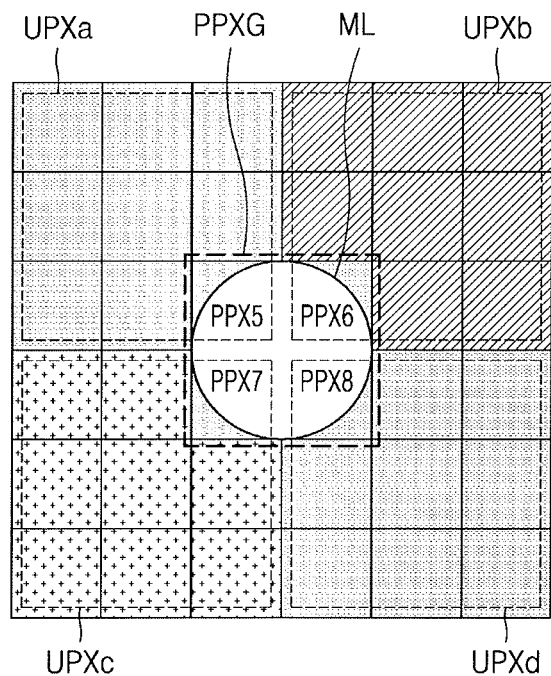
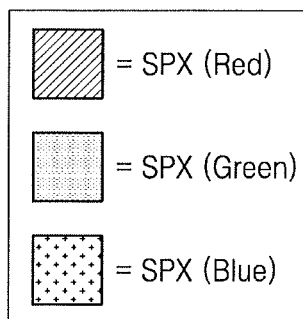

ID OF 12,506,977 B2

IMAGE SENSOR WITH MULTIPLE EXPOSURE TIMES

CROSS-REFERENCE TO RELATED APPLICATIONS

This is a continuation application based on pending application Ser. No. 16/685,361, filed Nov. 15, 2019, the entire contents of which is hereby incorporated by reference.

Korean Patent Application No. 10-2019-0033727, filed on Mar. 25, 2019, in the Korean Intellectual Property Office, and entitled: "Image Sensor and Operation Method Thereof," is incorporated by reference herein in its entirety.

BACKGROUND

1. Field

Embodiments relate to an image sensor, and more particularly, to an image sensor that includes sensing pixels sharing a floating diffusion node and phase detecting pixels sharing a microlens.

2. Description of the Related Art

An image sensor captures a two-dimensional image or a three-dimensional image of a subject. An image sensor generates an image of a subject by using a photoelectric conversion device that responds to an intensity of light reflected from the subject. Along with development in complementary metal-oxide semiconductor (CMOS) technology, a CMOS image sensor using CMOS is being widely used.

SUMMARY

According to one or more embodiments, an image sensor includes a pixel array, wherein the pixel array includes a first unit pixel including first sensing pixels adjacent along a column direction and second sensing pixels adjacent along the column direction, the first sensing pixels and the second sensing pixels being adjacent along a row direction, and a same color filter overlapping first and second sensing pixels. The first sensing pixels share a first floating diffusion node. The second sensing pixels share a second floating diffusion node.

According to one or more embodiments, an image sensor includes a pixel array that outputs a pixel signal, the pixel array including a plurality of sensing pixels and a plurality of phase detecting pixels, a timing controller configured to output a control signal based on operation mode information that instructs a general photographing mode or a high dynamic range (HDR) photographing mode, and a read circuit configured to output pixel data based on the control signal and the pixel signal, wherein some of the plurality of sensing pixels may share one floating diffusion node and output the pixel signal through one column line.

According to one or more embodiments, an operation method of an image sensor includes sequentially outputting pixel signals by a plurality of sensing pixels through a shared floating diffusion node, receiving operation mode information that instructs a general photographing mode or a high dynamic range (HDR) photographing mode, performing an analog binning operation on the pixel signals when the operation mode information instructs the general photographing mode, and performing at least one of a reconstruction operation and a dynamic range compression (DRC) operation on the pixel signals when the operation mode information instructs the HDR photographing mode.

BRIEF DESCRIPTION OF THE DRAWINGS

Features will become apparent to those of skill in the art by describing in detail exemplary embodiments with reference to the attached drawings in which:

FIG. 3 illustrates a pixel array according to an embodiment;

FIGS. 5A through 5D illustrate unit pixel groups that include a plurality of sensing pixels which have various exposure time periods under a high dynamic range (HDR) photographing mode according to an embodiment;

FIGS. 13A through 13D illustrate diagrams of a phase detecting pixel group in which a plurality of phase detecting pixels are included and a microlens according to an embodiment.

DETAILED DESCRIPTION

Figure 1:
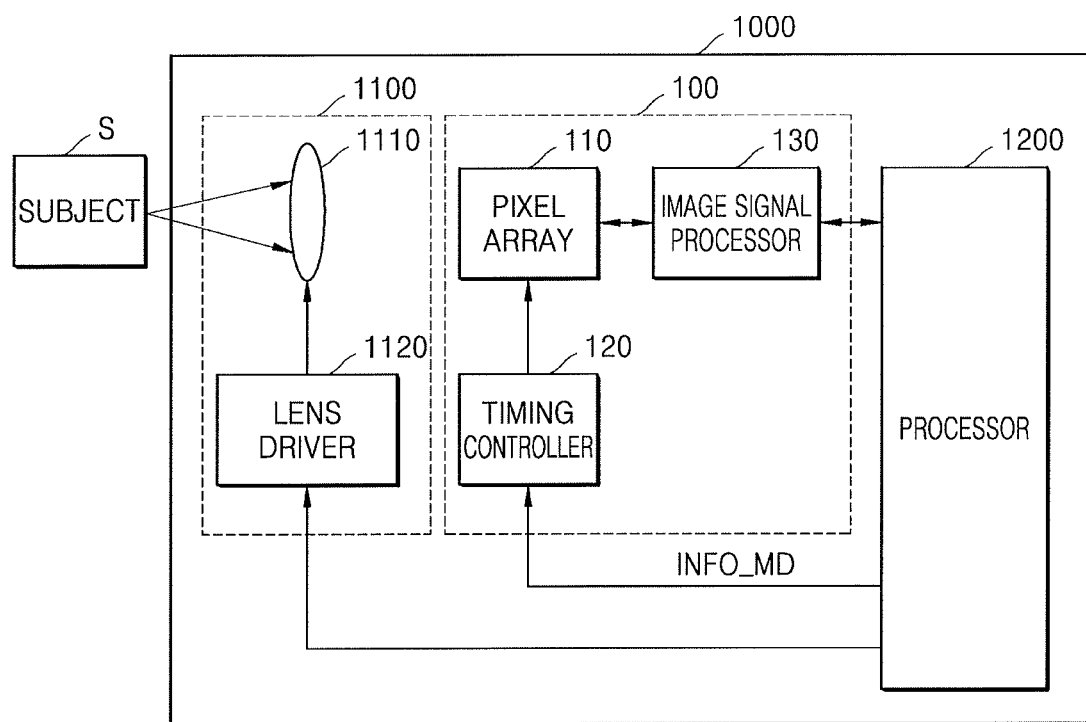
FIG. 1 illustrates an image photographing apparatus according to an embodiment.

FIG. 1 illustrates an image photographing apparatus 1000 according to an embodiment. Referring to FIG. 1, the image photographing apparatus 1000 may include a photographing unit 1100, an image sensor 100, and a processor 1200. The image photographing apparatus 1000 may acquire image data by photographing a subject S and may perform an auto-focusing function.

All operations of the image photographing apparatus 1000 may be controlled by the processor 1200. The processor 1200 may provide, to a lens driver 1120, a timing controller 120, and the like, a control signal and/or information for operations of each component. For example, the processor 1200 may provide, to the timing controller 120, operation mode information INFO_MD that instructs a general photographing mode or a high dynamic range (HDR) photographing mode.

The photographing unit 1100 may include a lens 1110 and a lens driver 1120. The lens 1110 may include at least one lens. In addition, the photographing unit 1100 may further include an aperture and an aperture driving unit.

The lens driver 1120 may exchange information regarding focus detection with the processor 1200 and may adjust positions of the lens 1110 in response to a control signal provided by the processor 1200. The lens driver 1120 may drive the lens 1110 in a direction in which a distance between the subject S and the lens 1110 increases or decreases to adjust the distance between the lens 1110 and the subject S. According to positions of the lens 1110, the subject S may be in focus or out of focus.

The image photographing apparatus 1000 may perform phase detection auto focusing (PDAF). For example, when the distance between the lens 1110 and the subject S is relatively short, the lens 1110 may be out of an in-focus position for the subject S and a phase difference may occur between images that are captured by the image sensor 100. The lens driver 1120 may move the lens 1110 in a direction in which the distance between the subject S and the lens 1110 increases, in response to a control signal provided from the processor 1200.

Alternatively, when the distance between the lens 1110 and the subject S is relatively long, the lens 1110 may be out of focus and a phase difference may occur between images that are captured by the image sensor 100. The lens driver 1120 may move the lens 1110 in a direction in which the distance between the subject S and the lens 1110 decreases, in response to the control signal provided from the processor 1200.

The image sensor 100 may convert light incident on the image sensor 100 to image data. The image sensor 100 may include a pixel array 110, a timing controller 120, and an image signal processor 130. An optical signal transmitted through the lens 1110 may reach a light receiving surface of the pixel array 110 and determine an image of the subject S.

The pixel array 110 may be a Complementary Metal Oxide Semiconductor Image Sensor (CIS) that converts the optical signal into an electric signal. An exposure time period and sensitivity of the pixel array 110 may be adjusted by the timing controller 120. The pixel array 110 may include a plurality of sensing pixels and a plurality of phase detecting pixels. The sensing pixels may operate to output image data of the subject S, and each of the phase detecting pixels may detect phase differences between the image data of the subject S and operate to move the lens 1110. Particular embodiments regarding the sensing pixels and the phase detecting pixels will be described later.

The processor 1200 may receive image data from the image signal processor 130, perform various image after-processing operations on the image data, and perform phase difference calculations.

For example, the processor 1200 may perform an image after-processing operation to adjust one or more image parameters, e.g., brightness, light and shade, gamma, luminance, and the like, for image data received from the sensing pixels. The image after-processing operation may include various operations for improving image quality, e.g., noise reduction, gamma correction, color filter array interpolation, color matrix, color correction, color enhancement, and the like. Next, the processor 1200 may perform an image compression operation to generate an image file and may also restore image data by using the image file.

As another example, the processor 1200 may perform a phase difference calculation for image data received from the phase detecting pixels. The processor 1200 may obtain a position of a focus, a direction of the focus, a distance between the subject S and the image sensor 100, and the like according to a result of the phase difference calculation. The processor 1200 may, based on the result of the phase difference calculation, output a control signal to the lens driver 1120 in order to move a position of the lens 1110.

According to embodiments, the image photographing apparatus 1000 may be included in various electronic devices. For example, the image photographing apparatus 1000 may be mounted in electronic devices such as a camera, a smart phone, a wearable device, an Internet of Things (IoT) device, a tablet personal computer (PC), a notebook PC, a personal digital assistant (PDA), a portable multimedia player (PMP), a navigation device, and a display device. In addition, the image photographing apparatus 1000 may be mounted in electronic devices that are provided as a component in a vehicle, furniture, a manufacturing device, a door, various measuring devices, and the like.

Figure 2:
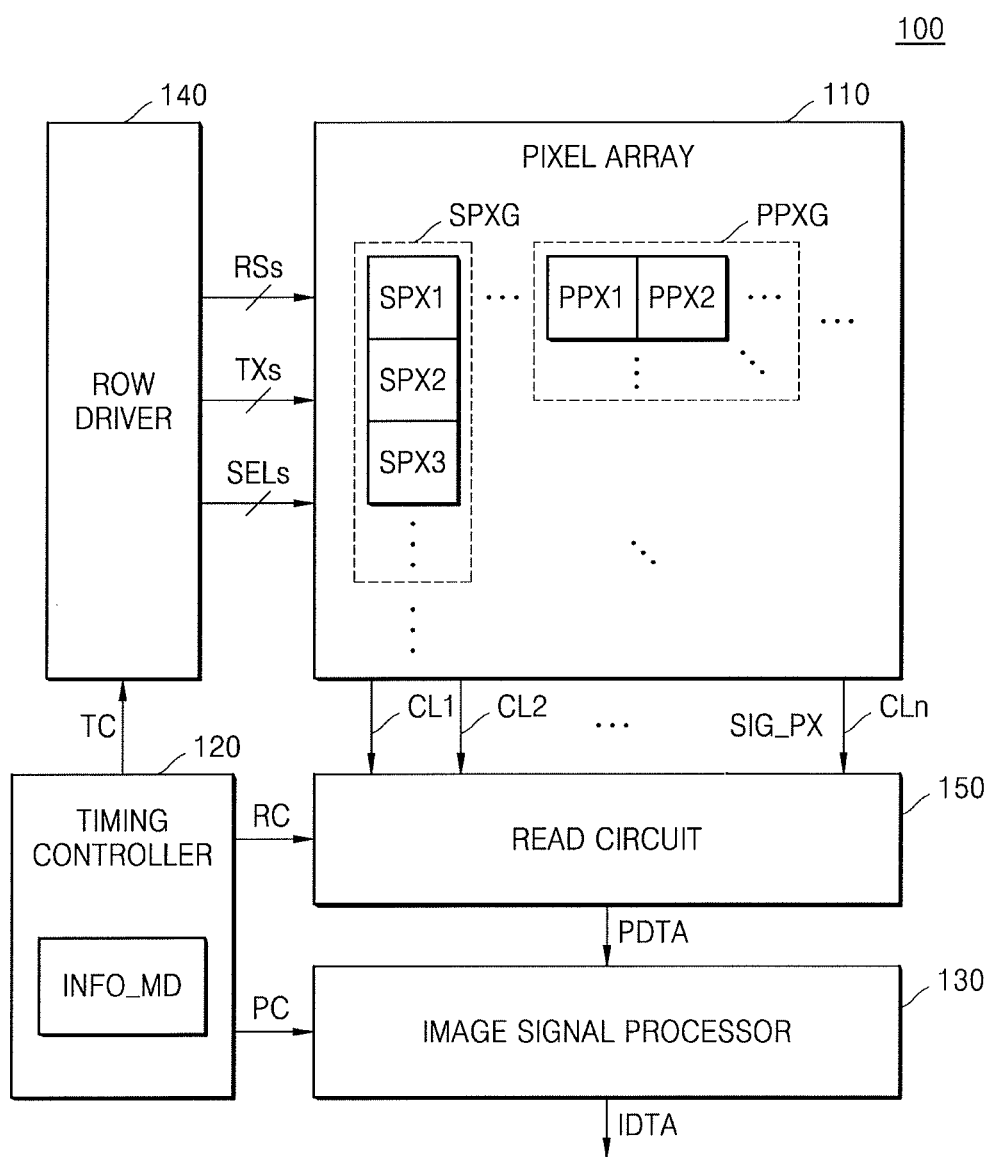
FIG. 2 illustrates an image sensor according to an embodiment.

FIG. 2 illustrates the image sensor 100 according to an embodiment. According to FIG. 2, the image sensor 100 may include the pixel array 110, the timing controller 120, the image signal processor 130, a row driver 140, and a read circuit 150.

The pixel array 110 may include a plurality of sub pixels arranged in a matrix and the plurality of sub pixels may include a plurality of sensing pixels SPX and a plurality of phase detecting pixels PPX. For example, a sub pixel may be a sensing pixel SPX, and as another example, the sub pixel may be a phase detecting pixel PPX. The plurality of sub pixels may each include a light sensing device, e.g., a photodiode. The light sensing device may generate photocharges from light incident from outside. The plurality of pixels may convert the photocharges into a voltage or a current signal to output the voltage or the current signal as a pixel signal SIG_PX through a plurality of column lines CL1 through CLn.

The pixel signal SIG_PX may include an image signal output from the sensing pixels SPX and a phase signal output from the phase detecting pixels PPX. For example, the plurality of sensing pixels SPX may output image signals that correspond to the subject S of FIG. 1 as the pixel signal SIG_PX, and as another example, the plurality of phase detecting pixels PPX may generate phase signals that are used to calculate phase differences between images that are generated by photographing the subject S.

According to an embodiment, the pixel array 110 may include a plurality of sensing pixel groups SPXG. The plurality of sensing pixel groups SPXG may be arranged to be adjacent from one another in a row direction. A plurality of sensing pixels (e.g., the SPX1 through SPX3) included in the sensing pixel group SPXG may share one floating diffusion node (e.g., the floating diffusion node FD shown in FIG. 6A). The plurality of sensing pixels may output the pixel signal SIG_PX through an extended column line. In this case, the plurality of sensing pixels SPX included in the sensing pixel groups SPXG may include color filters having a same color. The sensing pixels SPX included in a same column may output the pixel signal SIG_PX in units of rows. For example, from among the plurality of sensing pixels SPX included in the sensing pixel group SPXG, a first sensing pixel SPX1 arranged in a first row, a second sensing pixel SPX2 arranged in a second row, and a third sensing pixel SPX3 arranged in the third row may sequentially output the pixel signals SIG_PX, respectively. A high-quality image may be obtained at a low illumination level by using the pixel signal SIG_PX output from the plurality of sensing pixels SPX.

Figure 12:
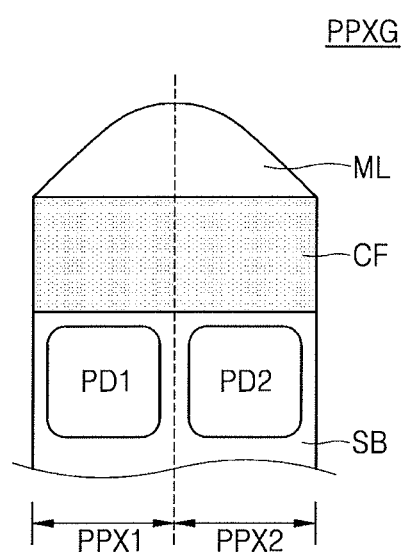
FIG. 12 illustrates a cross-sectional view of a structure of a phase detecting pixel group according to an embodiment.

According to an embodiment, a plurality of phase detecting pixels (e.g., PPX1 and PPX2) included in the phase detecting pixel group PPXG may include one same microlens (e.g., the microlens ML of FIG. 12). The phase detecting pixels PPX may increase the number of pixels for each unit area of the pixel array 110 by sharing the microlens. In this case, the plurality of phase detecting pixels PPX included in the phase detecting pixel group PPXG may include color filters having a same color, as light in a same wavelength band is used for the phase difference calculation.

The timing controller 120 may control the row driver 140 by providing a timing control signal TC to the row driver 140 to have the pixel array 110 accumulate an electric charge by absorbing light, temporarily store the accumulated electric charge, and output an electric signal according to the stored electric charge to an external region of the pixel array 110.

According to an embodiment, the timing controller 120 may control an exposure time period of the sensing pixel SPX or the phase detecting pixel PPX with reference to the operation mode information INFO_MD. For example, the operation mode information INFO_MD may instruct the general photographing mode or the HDR photographing mode.

For example, the timing controller 120 may, based on the operation mode information INFO_MD that instructs the general photographing mode, transmit a timing control signal TC to the row driver 140 such that the first sensing pixel SPX1 in the first row, the second sensing pixel SPX2 in the second row, and the third sensing pixel SPX3 in the third row have a same exposure time period. As another example, the timing controller 120 may, based on the operation mode information INFO_MD that instructs the HDR photographing mode, transmit the timing control signal TC to the row driver 140 such that a sensing pixel SPX1 in the first row, a sensing pixel SPX2 in the second row, and a sensing pixel SPX3 in the third row have different exposure time periods.

According to an embodiment, the timing controller 120 may control at least one of the image signal processor 130 and a read circuit 150 with reference to the operation mode information INFO_MD.

For example, the timing controller 120 may, based on the operation mode information INFO_MD that instructs the general photographing mode, control the read circuit 150 and the image signal processor 130 to perform analog binning and digital binning. The analog binning may refer to an operation of binning the pixel signals SIG_PX that are output from the sensing pixels (for example, the first sensing pixel SPX1, the second sensing pixel SPX2, and the third sensing pixel SPX3) that share the floating diffusion node FD. The digital binning may refer to an operation of binning pixel data PDTA that is analog-binned. The analog binning and the digital binning will be described in detail with reference to FIGS. 7 through 9.

As another example, the timing controller 120 may, based on the operation mode information INFO_MD that instructs the HDR photographing mode, control the image signal processor 130 to perform a reconstruction operation and a dynamic range compression (DRC) operation. The controlling of the image signal processor 130 will be described in detail with reference to FIGS. 7 and 10 through 11.

The row driver 140 may generate signals (e.g., reset control signals RSs, transmission control signals TXs, selection signals SELSs, and the like) to control the pixel array 110 and provide the signals to the plurality of sub pixels in the pixel array 110. The row driver 140 may determine activation timing and deactivation timing of the reset control signals RSs, the transmission control signals TXs, and the selection signals SELSs for the plurality of sensing pixels SPX and the plurality of phase detecting pixels PPX.

The read circuit 150 may perform the analog binning operation and a correlated double sampling operation. The read circuit 150 may output pixel data PDTA as a result of the correlated double sampling operation to the image signal processor 130 or the processor 1200. The output of the read circuit 150 will be described in detail with reference to FIG. 8.

The image signal processor 130 may perform various signal processing operations on the pixel data PDTA. The image signal processor 130 may perform the digital binning operation, the noise reduction process, gain adjustment, a waveform standardization process, an interpolation process, a white balance process, the gamma process, an edge emphasis process, and the like. In addition, the image signal processor 130 may make the processor 1200 perform a phase difference calculation by outputting phase information of the phase detecting pixels to the processor 1200 when performing the PDAF. In an embodiment, the image signal processor 130 may be provided in a general-purpose image processor (for example, the processor 1200 (see FIG. 1)) located outside the image sensor 100.

Figure 4:
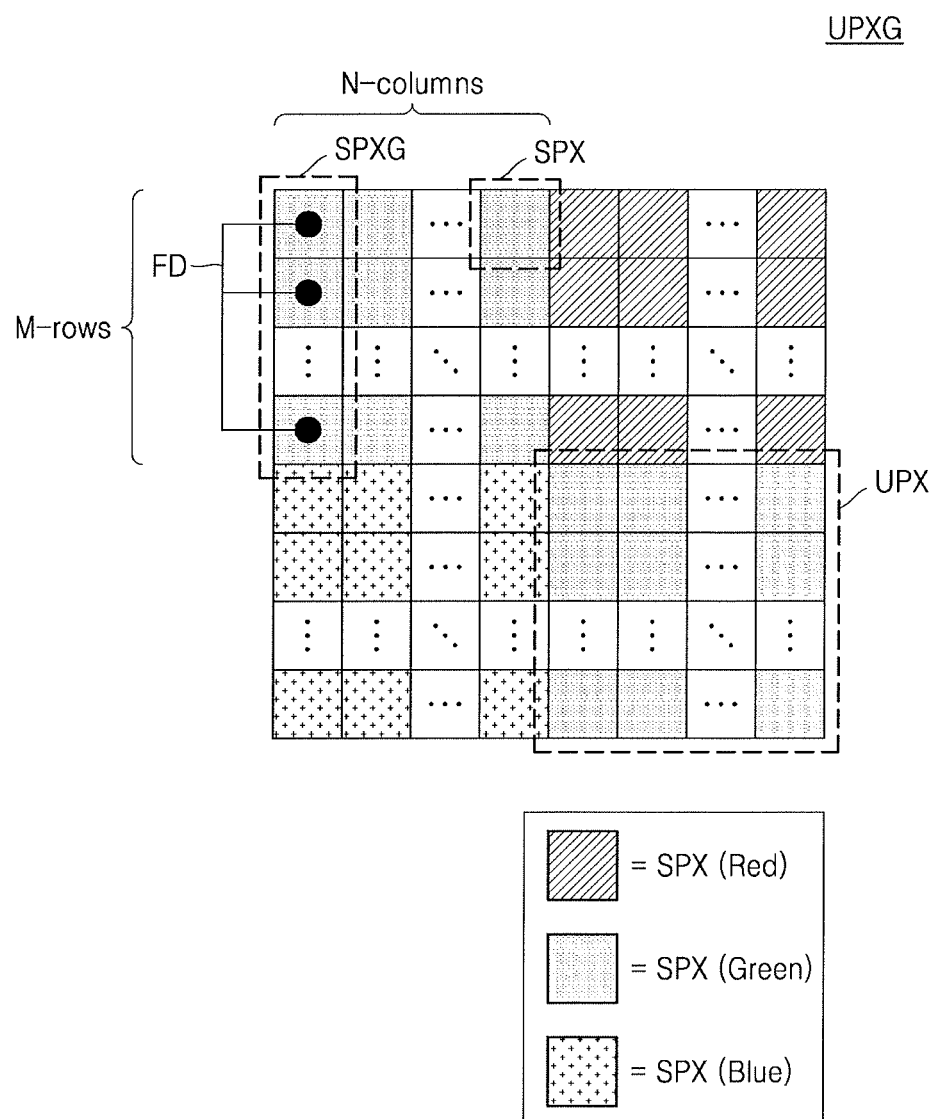
FIG. 4 illustrates a unit pixel group according to an embodiment.

FIG. 3 is a diagram of the pixel array 110 according to an embodiment. FIG. 4 is a diagram of a unit pixel group UPX according to an embodiment. FIG. 4 is an enlarged view of a unit pixel group UPXG shown in FIG. 3.

Referring to FIG. 3, the pixel array 110 may include a plurality of unit pixel groups UPXG, and the unit pixel group UPXG may include a plurality of unit pixels UPX. Referring to FIG. 4, the unit pixel UPX may include a plurality of sub pixels including color filters identical to one another. For example, the sub pixel may be the sensing pixel SPX or the phase sensing pixel PPX.

According to embodiments, the unit pixel group UPXG may include red unit pixels, blue unit pixels, and green unit pixels together forming a Bayer pattern. In other words, the unit pixel group UPXG may be formed into an RGBG Bayer pattern (also called a RGB Bayer pattern). In implementations, the unit pixel group UPXG may include various patterns, e.g., a red, green, blue, white (RGBW) pattern, a cyan, yellow, green, magenta (CYGM) pattern, a red, green, blue, emerald (REBE) pattern, a cyan, magenta, yellow, white (CMYW) pattern, and the like.

Referring to FIGS. 3 and 4, a unit pixel UPX may include a plurality of sensing pixels SPX arranged in a matrix, e.g., an M-row by N-column matrix (N and M are respectively natural numbers). The plurality of sensing pixels SPX adjacent to one another in a column direction may form a sensing pixel group SPXG that shares a floating diffusion node FD. For example, one unit pixel UPX may include M rows and N columns of sensing pixels SPX that share N floating diffusion nodes FD. For example, the sensing pixels SPX arranged in a same column may share same floating diffusion nodes FD. For convenience, only the green sensing pixels are shown as sharing the floating diffusion node FD in FIG. 4, but may be equally applied to the red sensing pixels and the blue sensing pixels. FIGS. 5A through 5D are diagrams of unit pixel groups that include a plurality of sensing pixels which have various exposure time periods under a HDR photographing mode according to an embodiment.

Referring to FIGS. 5A through 5D, the unit pixel UPX may include a plurality of sensing pixels L, M, and S. For example, the unit pixel UPX may include the plurality of sensing pixels SPX arranged in an M*N matrix, e.g., a 3*3 matrix.

According to an embodiment, in the HDR photographing mode, the light sensing devices included in the plurality of sensing pixels SPX may have different exposure time periods. For example, a first sensing pixel L may include a light sensing device exposed for a first time period, a second sensing pixel M may include a light sensing device exposed for a second time period, and a third sensing pixel S may include a light sensing device exposed for a third time period. Here, the first time period may be longer than the second time period, and the second time period may be longer than the third time period, e.g., long, medium, and short time periods.

Figure 5A:
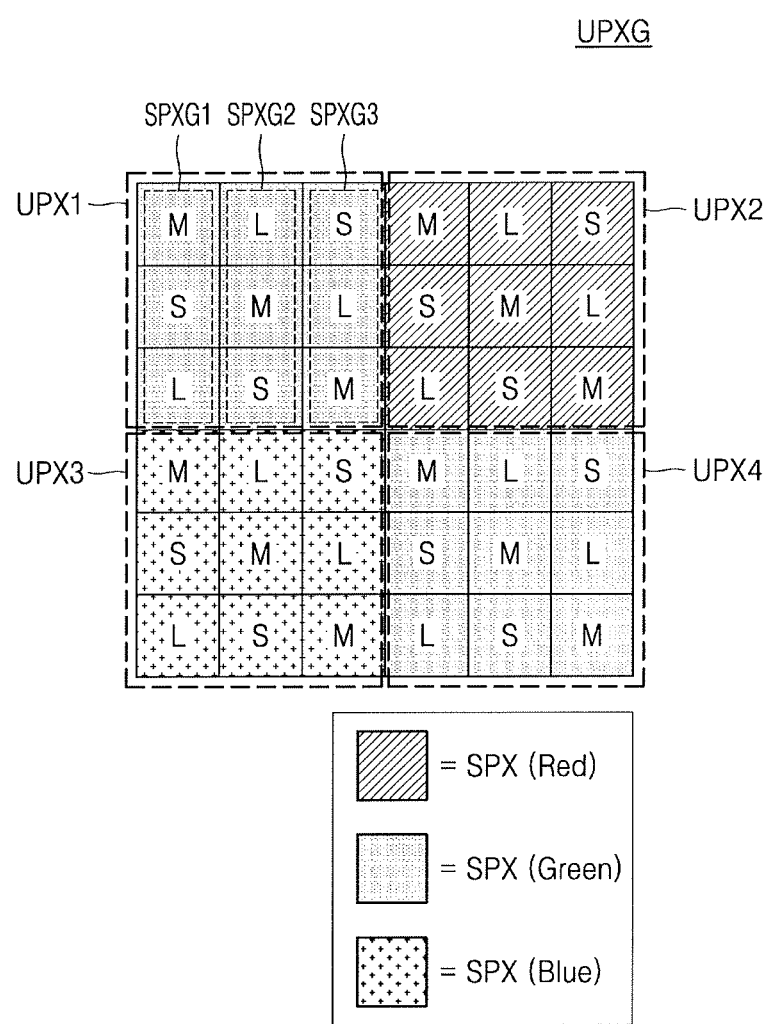

Referring to FIG. 5A, the unit pixel group UPXG may include a first unit pixel UPX1, a second unit pixel UPX2, a third unit pixel UPX3, and a fourth unit pixel UPX4 that have a same exposure time period. The first unit pixel UPX1 may include a first sensing pixel group SPXG1, a second sensing pixel group SPXG2, and a third sensing pixel group SPXG3 for each column in the first unit pixel UPX1. Each sensing pixel group SPXG may include the plurality of sensing pixels SPX in one column, and the sensing pixels that are adjacent to one another may have different exposure time periods.

The first sensing pixel group SPXG1 may include sensing pixels L, S, M that are sequentially arranged in a column direction in the order of the second sensing pixel M, the third sensing pixel S, and the first sensing pixel L. The sensing pixel group SPXG2 may sequentially include the first sensing pixel L, the second sensing pixel M, and the third sensing pixel S for each column. The third sensing pixel group SPXG3 may sequentially include the third sensing pixel S, the first sensing pixel L, and the second sensing pixel M.

Figure 5B:
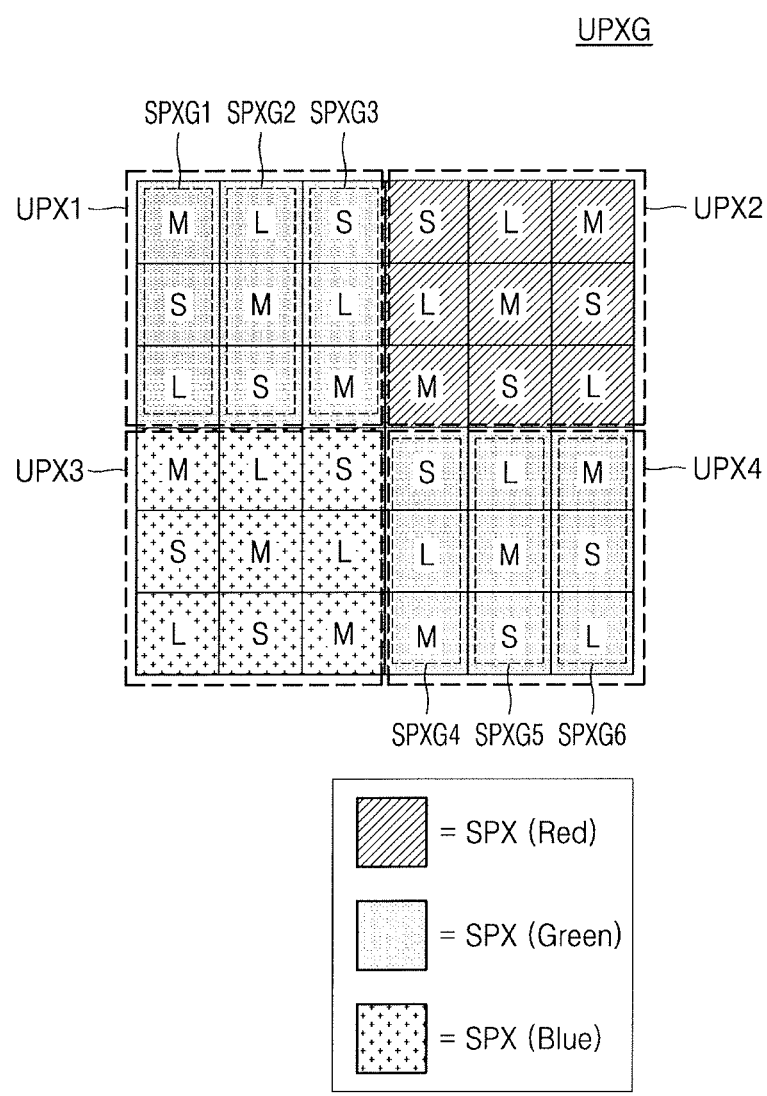

Referring to FIG. 5B, some of the first unit pixel UPX1 through the fourth unit pixel UPX4 may have different exposure time period patterns. For example, the unit pixels UPX located in a same column may have a same exposure time period pattern, the unit pixels UPX located in a same row may have different exposure time period patterns. For example, the first unit pixel UPX1 and the third unit pixel UPX3 may have a same exposure time period pattern, the first unit pixel UPX1 and the second unit pixel UPX2 may have different exposure time period patterns, and the second unit pixels UPX2s and the fourth unit pixel UPX4 may have a same exposure time pattern.

The fourth unit pixel UPX4 may include a fourth sensing pixel group SPXG4, a fifth sensing pixel group SPXG5, and a sixth sensing pixel group SPXG6 for each column in the fourth unit pixel UPX4. The fourth sensing pixel group SPXG4 may include sensing pixels L, S, and M that are sequentially arranged in the column direction in the order of the third sensing pixel S, the first sensing pixel L, and the second sensing pixel M. The fifth sensing pixel group SPXG5 may sequentially include the first sensing pixel L, the second sensing pixel M, and the third sensing pixel S for each column. The sixth sensing pixel group SPXG6 may sequentially include the second sensing pixel M, the third sensing pixel S, and the first sensing pixel L.

Referring to FIG. 5C, some of the first unit pixel UPX1 through the fourth unit pixel UPX4 may have different exposure time patterns. For example, the unit pixels that are adjacent to each other in a diagonal direction may have a same exposure time period pattern. The first unit pixel UPX1 and the fourth unit pixel UPX4 may have a same exposure time period pattern, and the second unit pixel UPX2 and the third unit pixel UPX3 may have a same exposure time period pattern.

Referring to FIGS. 5A through 5C, each unit pixel UPX may include the plurality of sensing pixels SPX, and each sensing pixel included in one unit pixel UPX may include an exposure time period different from an exposure time period of an adjacent sensing pixel. For example, as for the first unit pixel UPX1, a pixel adjacent to the second sensing pixel M located at a center of the first sensing pixel L or the third sensing pixel S.

Referring to FIG. 5D, the unit pixel group UPXG may include the first unit pixel UPX1 through the fourth unit pixel UPX4 that have different exposure time period patterns. The first unit pixel UPX1 through the fourth unit pixel UPX4 may each include the first sensing pixel group SPXG1 including the first sensing pixels L, the second sensing pixel group SPXG2 including the second sensing pixels M, and the third sensing pixel group SPXG3 including the third sensing pixels S. In addition, the first unit pixel UPX1 through the fourth unit pixel UPX4 may include the plurality of sensing pixels SPX in each column, in which the sensing pixels SPX may have a same exposure time period.

Figure 6A:
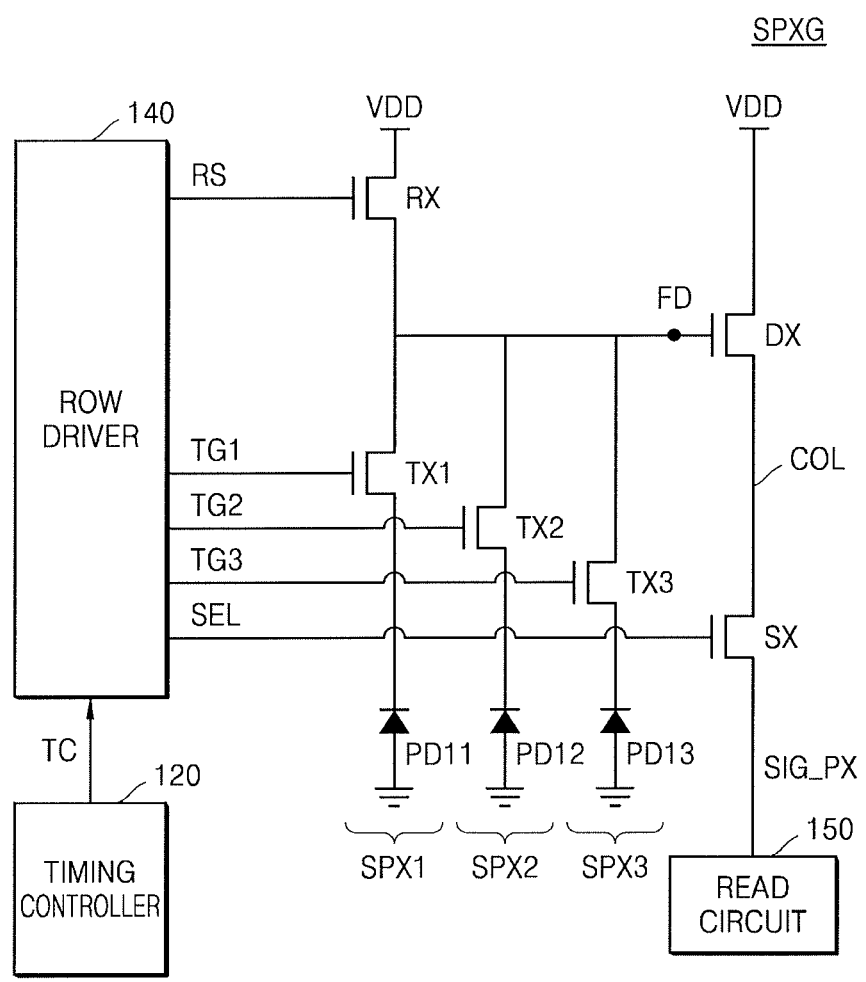
FIG. 6A illustrates a circuit diagram of a sensing pixel group including a plurality of sensing pixels according to an embodiment.
Figure 6B:
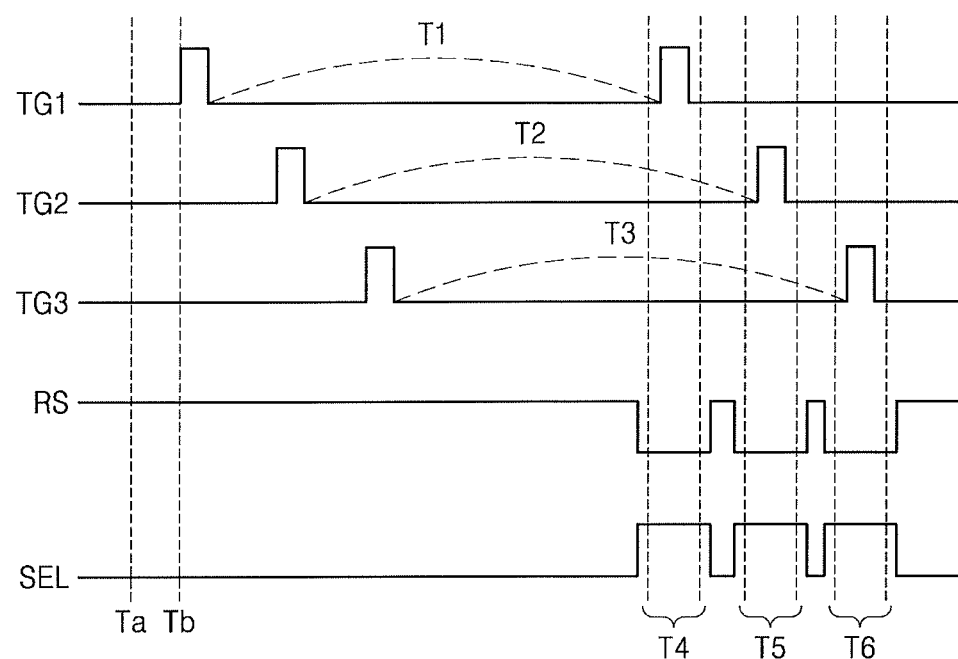
FIG. 6B is a waveform diagram of a signal applied to the sensing pixel group shown in FIG. 6A.

FIG. 6A is a circuit diagram of the sensing pixel group in which the plurality of sensing pixels are included according to an embodiment. FIG. 6B is a waveform diagram form of a signal applied to the sensing pixel group shown in FIG. 6A.

Referring to FIG. 6A, the sensing pixel group SPXG may include a plurality of sensing pixels SPX1 through SPX3 adjacent along a column direction. The sensing pixel SPX may include the light sensing device PD, and the row driver 140 may control operations of a transmission transistor TX under control of the timing controller 120. The transmission transistor TX may be turned on to output a photocharge accumulated by the light sensing device PD.

For example, the first sensing pixel SPX1 may include a first light sensing device PD11. The first sensing pixel SPX1 may also include a first transmission transistor TX1 which controls an output of photocharge accumulated by the first light sensing device PD11. The row driver 140 may apply a first transmission signal TG1 to the first transmission transistor TX1 based on a timing control signal TC transmitted from the timing controller 120. For example, the timing controller 120 may apply the first transmission signal TG1, which instructs the transmission transistor TX1 to turn on. Accordingly, the first light sensing device PD11 may output photocharge to the floating diffusion node FD. Likewise, the timing controller 120 may control the row driver 140 to control the second transmission transistor TX2 and the third transmission transistor TX3 to respectively output photocharges, which are charged by the second light sensing device PD12 and the third light sensing device PD13, to a same floating diffusion node FD.

The timing controller 120 may turn on the selection transistor SX to output the photocharge charged in the floating diffusion node FD to the read circuit 150 as the pixel signal SIG_PX. For example, the timing controller 120 may transmit the timing control signal TC to the row driver 140 to transmit the selection signal SEL that instructs turn on. Accordingly, the selection transistor SX connected to the column line COL may be turned on. The photocharge accumulated in the floating diffusion node FD may be amplified by a driving voltage VDD applied to a driving transistor DX and may be converted into the pixel signal SIG_PX. That is, the photocharge accumulated in the floating diffusion node FD may be converted into the pixel signal SIG_PX and may be output to the read circuit 150 via the selection transistor SX.

Referring to FIG. 6B, the first sensing pixel SPX1 through the third sensing pixel SPX3 may output the pixel signal SIG_PX at different time points T4 through T6, based on the photocharge obtained during each of the first exposure time period T1, the second exposure time period T2, and the third exposure time period T3.

At a time point Ta, the timing controller 120 may transmit a logic high reset signal RS to a reset transistor RX to reset the floating diffusion node FD. In this case, the reset transistor RX is turned on, and a voltage having a same level as that of the driving voltage VDD may be applied to the floating diffusion node FD.

At a time point Tb, the timing controller 120 may reset a logic high first transmission signal TG1 to a gate electrode of the first transmission transistor TX1. Accordingly, the first light sensing device PD11 may entirely discharge the photocharge, which is charged by the first light sensing device PD11, to the floating diffusion node FD, and the first light sensing device PD11 may be in a reset state.

In a time period T1, the first light sensing device PD11 may obtain a photocharge. That is, the first sensing pixel SPX1 may have an exposure time period as long as the time period T1. Likewise, the second sensing pixel SPX2 may have an exposure time period that is as long as a time period T2, and the third sensing pixel SPX3 may have an exposure time period that is as long as a time period T3.

According to an embodiment, photocharges output from the first light sensing device PD11, the second light sensing device PD12, and the third light sensing device PD13 may be transmitted to the floating diffusion node FD respectively at different time points (e.g., a time point T4, a time point T5, and a time point T6). Next, the first sensing pixel SPX1 through the third sensing pixel SPX3 may sequentially output the pixel signals SIG_PX according to orders in which the floating diffusion node FD received the photocharges. The pixel signals SIG_PX, which are sequentially output, may be used for the analog binning operation to be described hereinafter.

In the time period T4, the timing controller 120 may output the first transmission signal TG1 and the selection signal SEL respectively as logic high signals and may output the reset signal as a logic low signal. In response thereto, a photocharge charged for the time period T1 by the first light sensing device PD11 included in the first sensing pixel SPX1 may be delivered to the floating diffusion node FD, converted into the pixel signal SIG_PX, and may be output. Likewise, the second sensing pixel SPX2 may charge an optical charge for the time period T2, and in the time period T5, the second sensing pixel SPX2 may deliver the photocharge to the floating diffusion node FD, convert the photocharge into the pixel signal SIG_PX, and output the pixel signal SIG_PX. The third sensing pixel SPX3 may charge an photocharge for the time period T3. In the time period T6, the third sensing pixel SPX3 may deliver a photocharge to the floating diffusion node FD, convert the photocharge into the pixel signal SIG_PX, and output the pixel signal SIG_PX.

Referring to FIG. 6B, the timing controller 120 may receive the operation mode information INFO_MD that instructs the general photographing mode and may control the first sensing pixel SPX1, the second sensing pixel SPX2, and the third sensing pixel SPX3 to have a same exposure time period. In other words, the timing controller 120 may control the row driver such that transmission signals TG, which are output in the time period T1, the time period T2, and the time period T3, are substantially identical to one another.

Referring to FIG. 6B, the timing controller 120 may receive the operation mode information INFO_MD that instructs the HDR photographing mode and may control the first sensing pixel SPX1, the second sensing pixel SPX2, and the third sensing pixel SPX3 to have different exposure time periods. In other words, the timing controller 120 may control the row driver such that the transmission signals TG, which are output in the time period T1, the time period T2, and the time period T3, are different from one another.

Operations of the sensing pixels in the HDR photographing mode will be described with reference to FIGS. 5A, 6A, and 6B. The second sensing pixel group SPXG2 may include the first sensing pixel L having an exposure time period as long as a first time period, the second sensing pixel M having an exposure time period as long as a second time period, and the third sensing pixel S having an exposure time period as long as a third time period. The first time period may be longer than the second time period and the second time period may be longer than the third time period. In this case, the first sensing pixel L, the second sensing pixel M, and the third sensing pixel S shown in FIG. 5A may respectively correspond to the first sensing pixel SPX1, the second sensing pixel SPX2, and the third sensing pixel SPX3 shown in FIG. 6A. That is, the first sensing pixel L, which has a longest exposure time period, may obtain a photocharge for the time period T1, and the third sensing pixel S, which has a shortest exposure time period, may obtain a photocharge for the time period T3.

Referring to FIG. 6B, the first sensing pixel SPX1, the second sensing pixel SPX2, and the third sensing pixel SPX3 may output the photocharges obtained respectively in the light sensing devices PD, at different time points. For example, in the time period T4, the first sensing pixel SPX1 may transmit the photocharge from the first light sensing device PD11 to the floating diffusion node FD, convert the photocharge into the pixel signal SIG_PX, and output the pixel signal SIG_PX through a column line COL. Likewise, the second sensing pixel SPX2 may output the pixel signal SIG_PX in the time period T5, and the third sensing pixel SPX3 may output the pixel signal SIG_PX in the time period T6.

Figure 7:
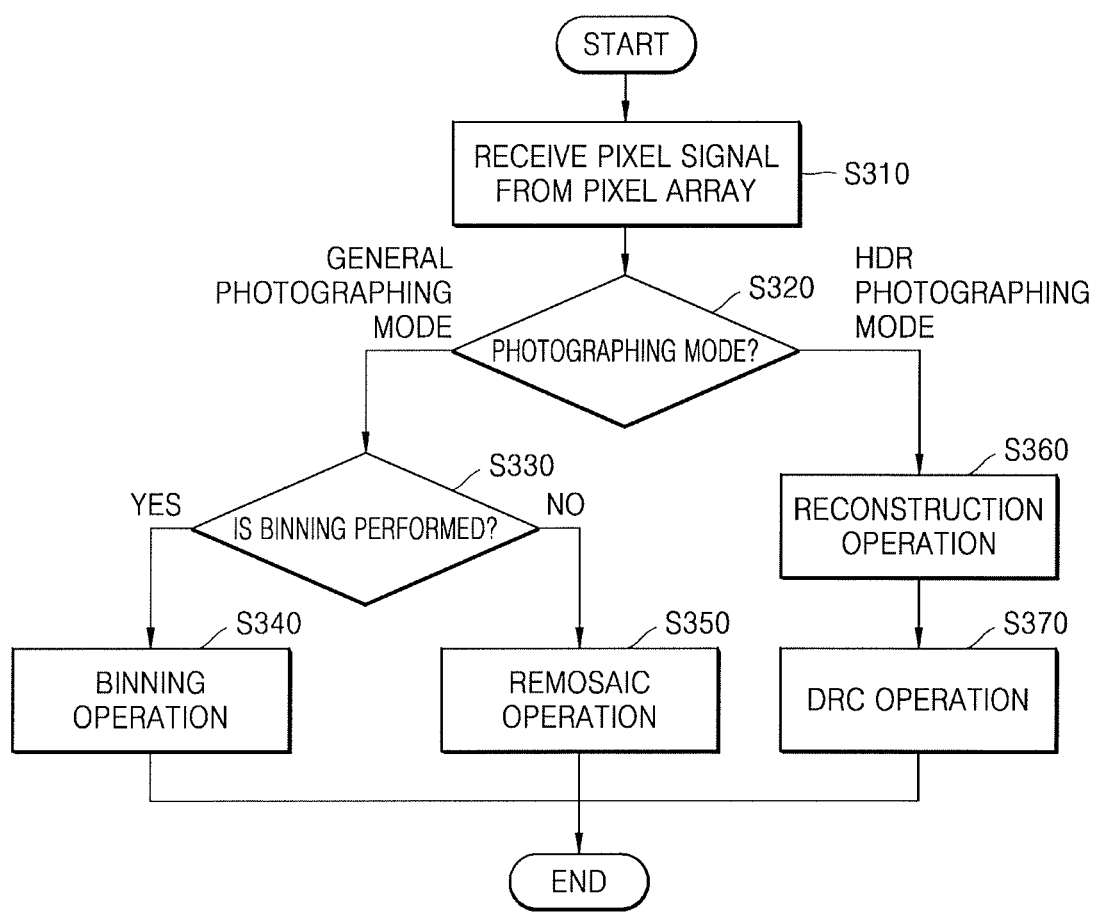
FIG. 7 illustrates a flowchart of an operation method of an image sensor according to an embodiment.

FIG. 7 is a flowchart of an operation method of the image sensor 100 according to an embodiment.

A pixel signal SIG_PX may be received from the pixel array 110 (S310). For example, the pixel array 110 may include the plurality of sensing pixels SPX, and at least some of the sensing pixels SPX may share the floating diffusion node FD.

Various image processing may be performed according to a photographing mode of the pixel signal SIG_PX (S320). The timing controller 120 may control the image sensor 100 based on the operation mode information INFO_MD that instructs the general photographing mode or the HDR photographing mode. For example, in the general photographing mode, the image sensor 100 may perform, based on the pixel signal SIG_PX, a binning operation that includes at least one of the analog binning operation and the digital binning operation. As another example, in the HDR photographing mode, the image sensor 100 may perform, based on the pixel signal SIG_PX, at least one of the reconstruction operation and the DRC operation. In other words, pixel signals sequentially output from the shared floating diffusion node may be individually used (general photographing mode) or synthesized (HDR photographing mode).

When the image sensor 100 is in the general photographing mode, the image sensor 100 may determine whether to perform the binning operation. For example, the timing controller 120 may transmit, to the read circuit 150, the control signal RC that includes information regarding whether to perform the binning operation.

The image sensor 100 may perform the binning operation (S340). For example, the image sensor 100 may perform the analog binning operation. The image sensor 100 may bin the pixel signals SIG_PX that are sequentially output from the sensing pixels SPX that share a same floating diffusion node FD. In this case, as electric signals output from the sensing pixels SPX may be added together, a bright image may be acquired at a low light level. As another example, the image sensor 100 may perform the digital binning operation. In this case, the image sensor 100 may perform the digital binning operation based on analog-binned data.

The image sensor 100 may perform a remosaic operation (S350). For example, the remosaic operation may be an operation to rearrange orders of data obtained from each sensing pixel SPX with respect to the pixel data PDTA quantized through the read circuit 150. By doing so, an image that has a resolution corresponding to the number of sensing pixels SPX may be obtained.

In the HDR photographing mode, the image sensor 100 may perform the reconstruction operation and perform the DRC operation on data on which the reconstruction operation is performed (S360 and S370).

Figure 8:
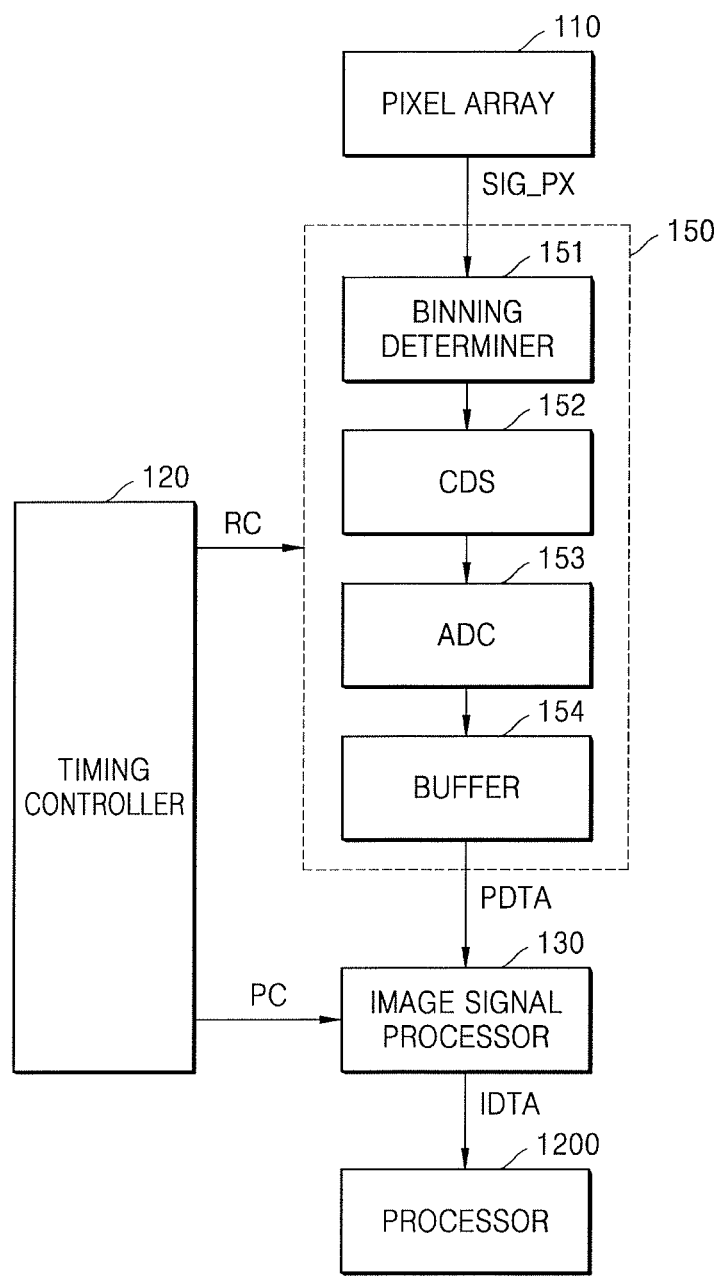
FIG. 8 illustrates an image processing operation in a general photographing mode according to an embodiment.

FIG. 8 illustrates an image processing operation in a general photographing mode according to an embodiment. The read circuit 150 may include a binning determiner 151, a correlated double sampler (CDS) 152, an analog-digital converter (ADC) 153, and a buffer 154.

The binning determiner 151 may receive a pixel signal SIG_PX output from the pixel array 110 and may receive, e.g., the pixel signals SIG_PX output from the plurality of sensing pixels SPX. According to an embodiment, in the general photographing mode, the timing controller 120 may control the binning determiner 151 to perform the analog binning operation.

Figure 9:
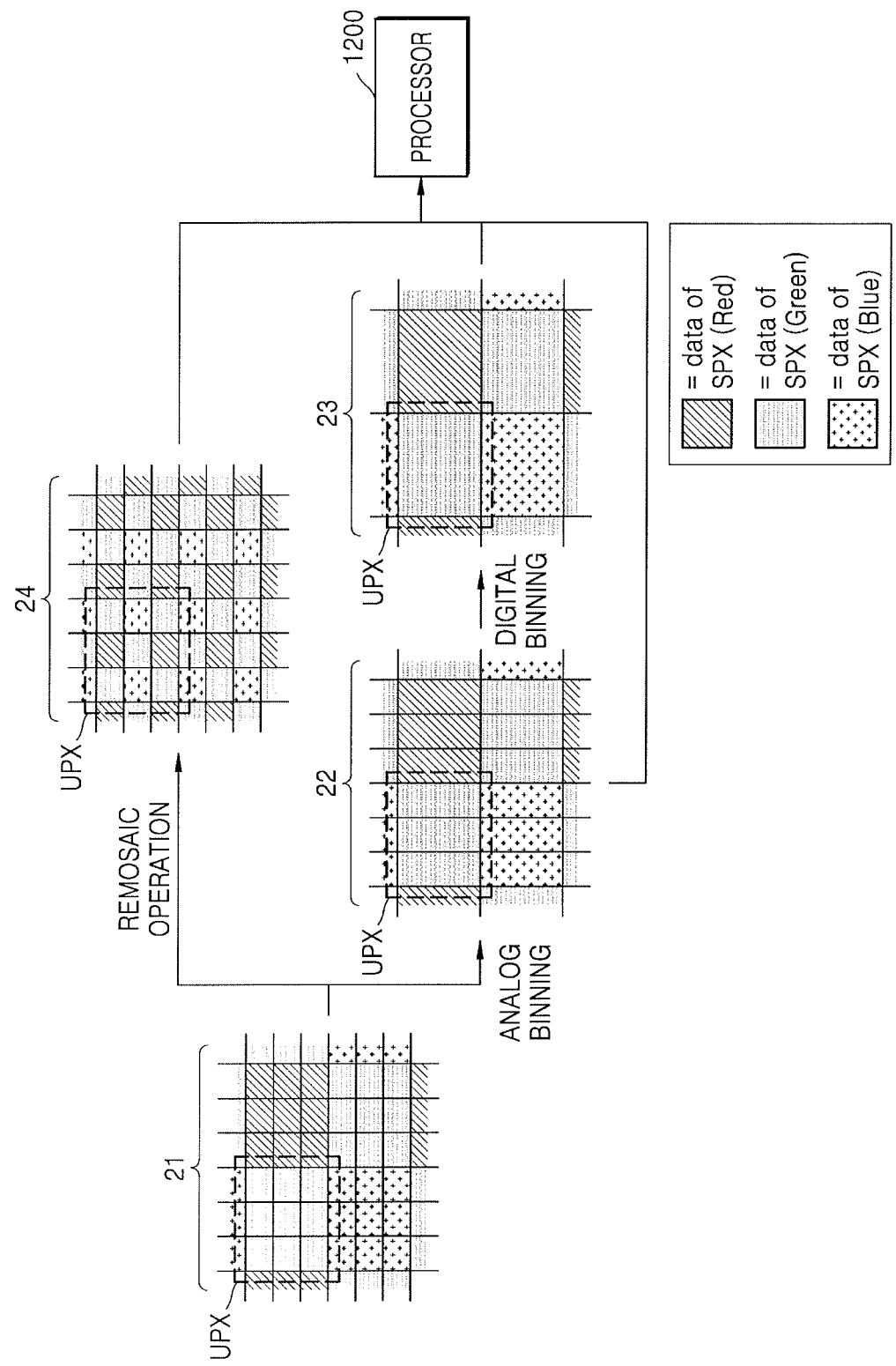
FIG. 9 illustrates an image processing operation in the general photographing mode according to an embodiment.

FIG. 9 illustrates an image processing operation in the general photographing mode according to an embodiment. Referring to FIG. 9, the binning determiner 151 may perform the analog binning operation on the pixel signals (21) to output the analog binned data (22). The binning determiner 151 may bin the pixel circuits SIG_PX acquired from the plurality of sensing pixels SPX included in the unit pixels UPX. For example, the binning determiner 151 may perform the analog binning operation on the pixel signals SIG_PX which are obtained from the plurality of sensing pixels SPX sharing the floating diffusion node FD. In other words, binning may be performed on the pixel signals SIG_PX which are obtained from the sensing pixels SPX arranged at a same column included in the unit pixel UPX. As another example, the binning determiner 151 may perform binning on the pixel signals SIG_PX that are sequentially output from the first sensing pixel SPX1 (see FIG. 6A), the second sensing pixel SPX2 (see FIG. 6A), and the third sensing pixel SPX3 (see FIG. 6A) that share the floating diffusion node FD and are arranged at a same column of the pixel array 110.

Referring back to FIG. 8, the correlated double sampler 152 may sample and hold the binned data. The correlated double sampler 152 may perform double sampling on a certain noise level and a level according to the generated output voltage and may output a level corresponding to a gap therebetween. In addition, the correlated double sampler 152 may receive lamp signals generated by the lamp signal generator, compare the lamp signals, and output a result of the comparison. The analog-digital converter 153 may convert an analog signal, which corresponds to a level of the output received from the correlated double sampler 152, to a digital signal. The buffer 154 may latch the digital signal, and the latched signal may be sequentially output to the image signal processor 130 or outside of the image sensor 100 (for example, the processor 1200).

The image signal processor 130 may receive the pixel data PDTA and perform the digital binning operation. Referring to FIGS. 8 and 9, the image signal processor 130 may receive the pixel data PDTA (22) on which the analog binning is performed and output data (23) that is digitally binned. For example, the image signal processor 130 may bin the pieces of data included in each of the unit pixels UPX into a piece of data. As another example, the image signal processor 130 may receive data that is analog binned in the row direction and may perform the digital binning in the column direction. In this case, the image signal processor 130 may output data (23) that has a resolution divided to match the number of sensing pixels included in the unit pixel UPX from a resolution according to the number of pixels arranged in the pixel array 110.

Referring to FIGS. 8 and 9, the image signal processor 130 may perform the remosaic operation. The image signal processor 130 may realign pieces of pixel data PDTA acquired from the sensing pixels SPX to match the Bayer pattern. In this case, the timing controller 120 may control the binning determiner 151 not to perform the analog binning operation. The image signal processor 130 may perform a remosaic operation on the pixel data PDTA from the read circuit 150 to output data 24 having a resolution identical to a resolution according to the number of pixels arranged in the pixel array 110. That is, when performing the remosaic operation, the image sensor 100 may output a high-resolution image.

Figure 10:
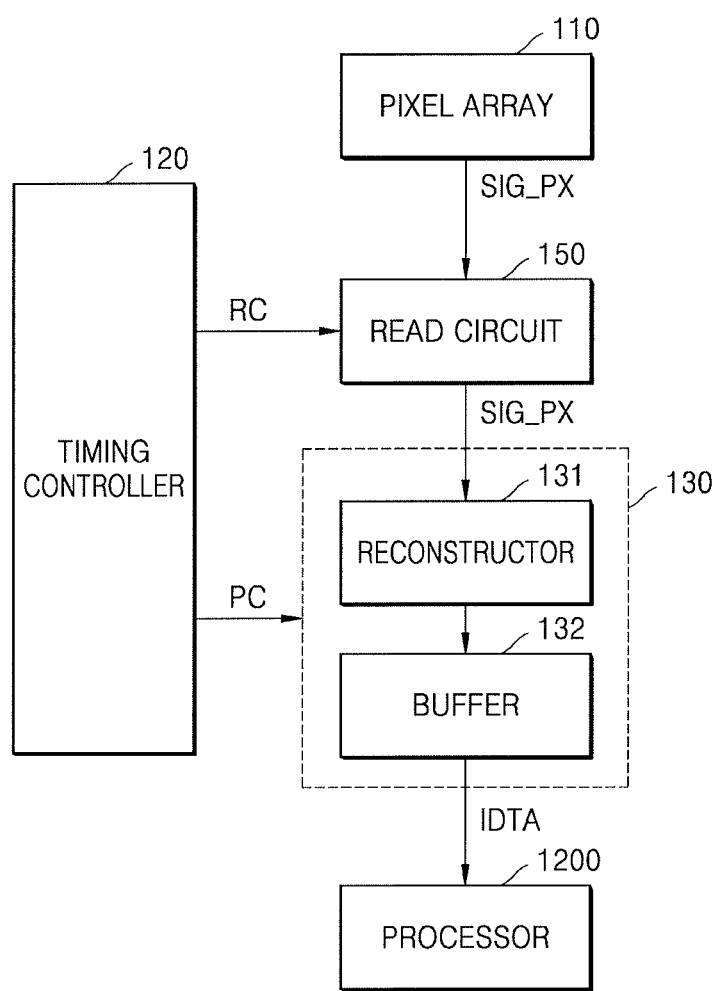
FIG. 10 illustrates an image processing operation in a High Dynamic Range (HDR) photographing mode according to an embodiment.

FIG. 10 is a flowchart of an image processing operation in a HDR photographing mode according to an embodiment. Referring to FIG. 10, the timing controller 120 may control the read circuit 150 to output the pixel data PDTA based on the pixel signal SIG_PX. For example, in the HDR photographing mode, the timing controller 120 may control the binning determiner 151 not to perform the analog binning operation. That is, the binning determiner 151 may output the pixel signal SIG_PX received from the pixel array 110 to the correlated double sampler 152. Following operations of the read circuit 150 are described above with reference to FIGS. 8 and 9 and thus will not be repeated.

The timing controller 120 may control the image signal processor 130 to perform the reconstruction operation and a dynamic range compression (DRC) operation. The reconstructor 131 may receive the pixel data PDTA, reconstruct the pieces of data acquired from the sensing pixels SPX and synthesize the pieces of data. In other words, the reconstructor 131 may receive the pieces of data having different exposure time periods and output image data in which a dynamic range is increased. The DRC unit 132 may perform a compression operation on the image data received from the reconstructor 131, without loss of the dynamic range. By using the compression function performed by the DRC unit 132, a general purpose process (for example, the processor 1200) may be used for an image post-processing operation.

Figure 11:
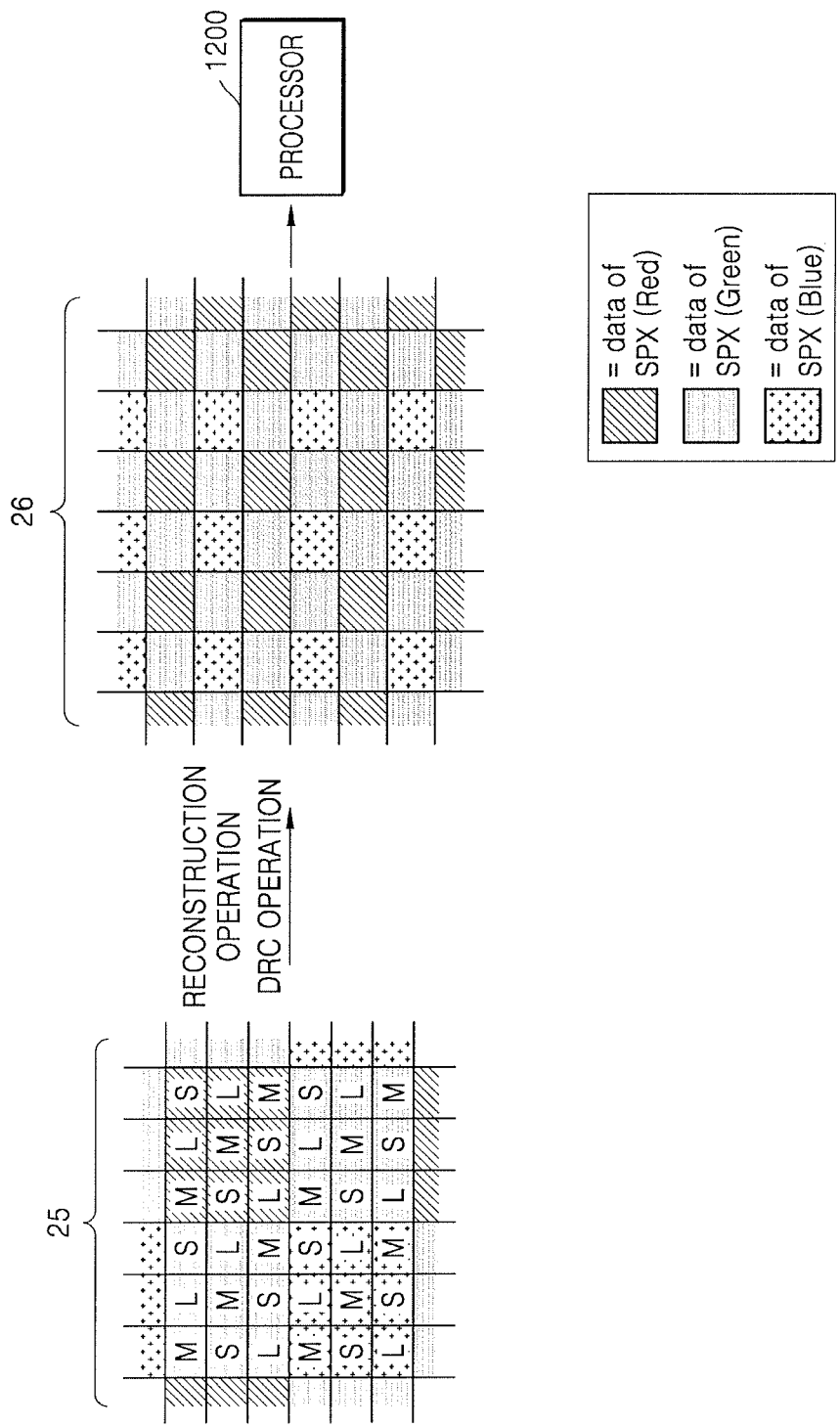
FIG. 11 illustrates an image processing operation under the HDR photographing mode according to an embodiment.

FIG. 11 illustrates the image processing operation under the HDR photographing mode according to an embodiment. Referring to FIG. 11, the image signal processor 130 may acquire image data (26) without loss of a resolution and a dynamic range by performing the reconstruction operation and the DRC operation on the pixel data (25) output from the read circuit 150. The image signal processor 130 may acquire the image data (26) having an improved dynamic range by reconstructing pixel data (25) having various exposure time periods. In addition, by performing the DRC operation, a dynamic range loss of the image data (26) and the image data may be output to the external region of the image sensor (e.g., the processor 1200).

According to embodiments, the image data (26) may be acquired based on the pieces of pixel data (25) collected based on different exposure time periods. For example, referring to the pieces of pixel data (25), the pieces of pixel data (25) may include pieces of pixel data set to have a long exposure time period L, a middle exposure time period M, and a short exposure time period S.

According to an embodiment, a resolution of the image data (26) may be lower than a resolution of the pixel data (25). For example, the image signal processor 130 may perform a reconstruction operation to reconstruct nine same-colored pixels from among the pieces of pixel data 25 into a single image pixel.

Meanwhile, the operations performed by the image signal processor 130 and described with reference to FIGS. 7 through 10 may also be performed by the processor 1200. For example, the digital binning operation, the remosaic operation, the reconstruction operation, and the DRC operation may be performed in substitution in the general purpose image processor (e.g., the processor 1200) or may be performed together by the general purpose image processor.

FIG. 12 is a cross-sectional view of a structure of a phase detecting pixel group PPXG according to an embodiment. Referring to FIG. 12, the phase detecting pixel group PPXG may include a plurality of phase detecting pixels PPX. In FIG. 12, the phase detecting pixel group PPXG includes two phase detecting pixels PPX1 and PPX2 for convenience of explanation. As will be described later with reference to FIGS. 13A through 13D, the phase detecting pixel group PPXG may include various numbers of phase detecting pixels PPX.

Referring to FIG. 12, each of the phase detecting pixels PPX may include the light sensing device PD. In addition, when light is incident on the phase detecting pixel PPX from the microlens ML, light in a certain wavelength band may be incident on the light sensing device PD through a color filter CF. The light sensing device PD may output an electric signal according to the incident light. For example, the light sensing device PD may output an electric signal to a transmission transistor (for example, the transmission transistor TX1 shown in FIG. 6A).

According to an example embodiment, the plurality of phase detecting pixels PPX may share one microlens ML. For example, a first light sensing device PD1 included in the first phase detecting pixel PPX1 and a second light sensing device PD2 included in the second phase detecting pixel PPX2 may receive light from the microlens ML. In other words, the first phase detecting pixel PPX1 and the second phase detecting pixel PPX2 may be adjacent to each other, and the microlens ML may cover the first phase detecting pixel PPX and the second phase detecting pixel PPX2.

According to an example embodiment, the phase detecting pixels PPX sharing the microlens ML may respectively include a color filter CF having a same color. For example, the color filter CF may have a red, blue, green or any appropriate wavelength. A substrate SB may be included in a peripheral area of the light sensing device PD.

According to an example embodiment, the phase detecting pixels PPX sharing the microlens ML may have a same exposure time period. In performing a PDAF operation, other parameters except a phase difference are to be similar or substantially identical to one another.

FIGS. 13A through 13D are diagrams of a phase detecting pixel group in which a plurality of phase detecting pixels are included and a microlens according to an embodiment. Referring to FIGS. 13A through 13D, the pixel array 110 may include the plurality of unit pixel groups UPXG, and the unit pixel group UPXG may include the plurality of unit pixels UPX. For example, the unit pixel UPX may include at least one of the sensing pixel SPX and the phase detecting pixel PPX. As another example, the unit pixel group UPXG may be formed such that the plurality of unit pixels UPX form a Bayer pattern.

In addition, the microlens ML covers at least a portion of the unit pixel group UPXG, and the plurality of unit pixels UPX including the microlens ML may be adjacent to one another. For example, the first unit pixel UPXa and the second unit pixel UPXb that include the microlens ML may be arranged adjacent to each other. As the first unit pixel UPXa and the second unit pixel UPXb have different color filters respectively include the phase detecting pixel PPX, loss of a pixel signal SIG_PX of a certain color may be reduced.

The sensing pixels SPX included in the unit pixel group UPXG may have various exposure time periods as described above with reference to FIGS. 5A through 5D and the like. The plurality of phase detecting pixels PPX included in the phase detecting pixel group PPXG may have a same exposure time period.

Referring to FIG. 13A, the microlens ML covers the phase detecting pixel group PPXG including the first phase detecting pixel PPX1 and the second phase detecting pixel PPX2. The first phase detecting pixel PPX1 and the second phase detecting pixel PPX2 may be respectively included in the first unit pixel UPXa and the second unit pixel UPXb.

In other words, the first unit pixel UPXa and the second unit pixel UPXb may respectively include the first phase detecting pixel PPX and the second phase detecting pixel PPX2 which are included in the phase detecting pixel group PPXG, and the microlens ML may cover the first phase detecting pixel PPX1 and the second phase detecting pixel PPX2.

According to an example embodiment, the phase detecting pixels PPX included in the phase detecting pixel group PPXG may include color filters having a same color. Although FIG. 13A shows a color filter for the phase detecting pixels PPX as being green color, but any other suitable color filter may be used.

According to an example embodiment, the phase detecting pixels PPX included in the phase detecting pixel group PPXG may have a same exposure time period. For example, the exposure time period may include the first time period described above with reference to FIG. 5A and accurate phase data may be acquired by exposing for a long time period. In an implementation, the phase detecting pixel may have various exposure time periods (e.g., the second time period or the third time period described above with reference to FIG. 5A).

According to an example embodiment, at least a portion of one unit pixel (e.g., UPXa) and at least a portion of another unit pixel (e.g., UPXb) may include the single microlens ML.

Figure 13B:
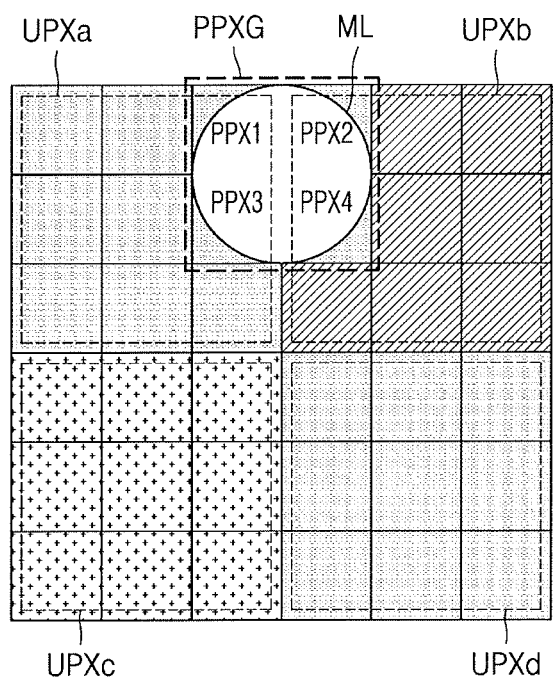

Referring to FIG. 13B, the microlens ML covers the phase detecting pixel group PPXG including four phase detecting pixels PPX. In other words, the microlens ML may cover a first phase detecting pixel PPX1 through a fourth phase detecting pixel PPX4. The phase detecting pixels PPX may be included respectively in the first unit pixel UPXa and the second unit pixel UPXb. In this case, the phase detecting pixels PPX included in the pixel detection pixel group PPXG may have a same color filter and a same exposure time period.

Referring to FIG. 13C, the microlens ML may be formed to cover the phase detecting pixel group PPXG including six phase detecting pixels PPX. That is, the microlens ML may cover the first phase detecting pixel PPX1 through a sixth phase detecting pixel PPX6. The phase detecting pixels PPX may be included respectively in the first unit pixel UPXa and the second unit pixel UPXb. Descriptions of the color filter and the exposure time period are the same as described above.

Referring to FIGS. 13A through 13C, the phase detecting pixel group PPXG may be included in some unit pixels (for example, the first unit pixel UPXa and the second unit pixels UPXb), but referring to FIG. 13D, the phase detecting pixel group PPXG may be included in all of the unit pixels (for example, UPXa through UPXd).

Referring to FIG. 13D, the microlens ML covers the phase detecting pixel group PPXG including four phase detecting pixels PPX. That is, the microlens ML may cover a fifth phase detecting pixel PPX5 through an eighth phase detecting pixel PPX8. In this case, the phase detecting pixel group PPXG may occupy a portion of each of the unit pixels UPXa through UPXd.

Figure 14:
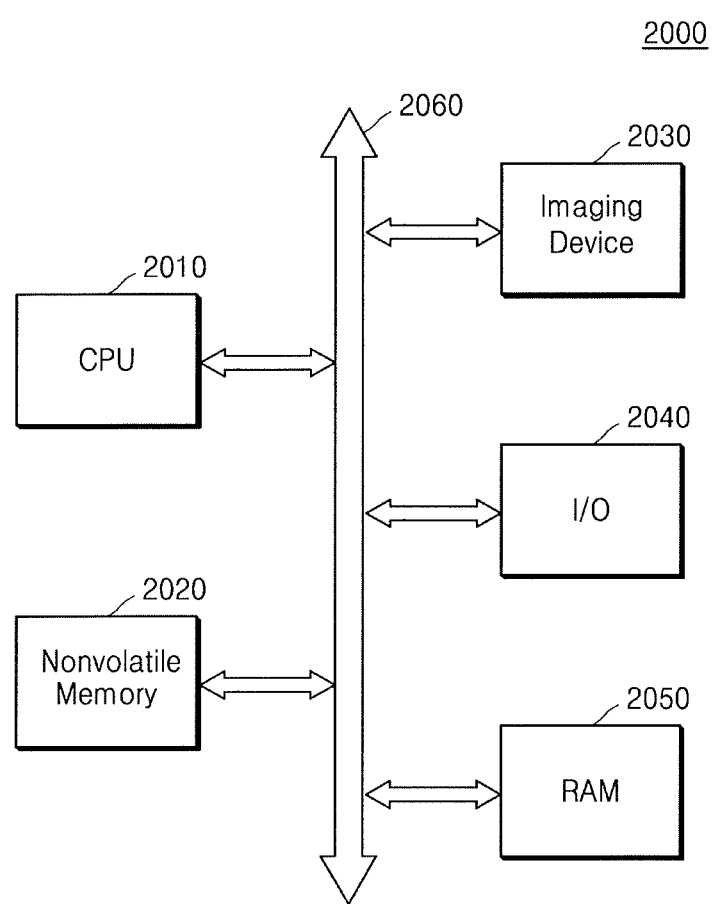
FIG. 14 illustrates an image processing system according to an embodiment.

FIG. 14 illustrates an image processing system 2000 according to an embodiment. The image processing system 2000 shown in FIG. 14 may include a computer system, a camera system, a scanner, a vehicle navigation system, a video phone, a security system, a motion detection system that require image data. Referring to FIG. 14, the image processing system 2000 may include a central processing unit (CPU) or a processor 2010, nonvolatile memory 2020, an imaging device 2030 including an image sensor, an input/output device 2040, and random access memory (RAM) 2050. The CPU 2010 may communicate with the nonvolatile memory 2020, the imaging device 2030, the input/output device 2040, and the RAM 2050, via a bus 2060.

The imaging device 2030 included in the image processing system 2000 of FIG. 14 may include the image sensor described above according to the embodiments. Image data output from the imaging device 2030 may be delivered, via the bus 2060, to the CPU 2010, the nonvolatile memory 2020, the input/output device 2040, and the RAM 2050. For example, an image sensor included in the imaging device 2030 may include sensing pixels that share a floating diffusion node and may also include phase detecting pixels that share a microlens. An image may be acquired by using the sensing pixels or an auto-focusing function may be performed by using the phase detecting pixels.

Embodiments provide a lightweight image sensor, the image sensor for improving a low illuminance property by summing up pieces of pixel data, obtaining a high-resolution image by using information of light received in each pixel, and performing a high dynamic range (HDR) operation and a phase detection auto focusing (PDAF) operation.

In an image sensor according to an example embodiment, a low luminance property may be improved by summing up information of a plurality of sensing pixels. In addition, a high-resolution image may be acquired by a remosaic operation. In addition, in a unit pixel having a plurality of sensing pixels, a HDR operation may be performed by varying exposure time periods of the plurality of sensing pixels. Furthermore, a phase detecting pixels may be included in the unit pixel by properly adopting a shape of a microlens, and a PDAF operation may be performed.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An image sensor, comprising:
a first unit pixel arranged in a first continued multiple columns and three adjacent rows from a first row to a third row, wherein the first unit pixel includes a first group and a second group for sensing a green color,
a second unit pixel arranged in a second continued multiple columns and the first to third rows, wherein the second unit pixel includes a third group and a fourth group for sensing a red color;
a third unit pixel arranged in the second continued multiple columns and three adjacent rows from a fourth row to a sixth row, wherein the third unit pixel includes a fifth group and a sixth group for sensing the green color; and,
a fourth unit pixel arranged in the first continued multiple rows and the fourth to sixth columns, wherein the fourth unit pixel includes a seventh group and an eighth group for sensing a blue color, wherein:
the first group has three photodiodes being configured to have a first exposure time period and the second group has three photodiodes being configured to have an exposure time period shorter than the first exposure time period,
the third group has three photodiodes being configured to have the first exposure time period and the fourth group has four photodiodes being configured to have an exposure time period shorter than the first exposure time period,
the fifth group has three photodiodes being configured to have the first exposure time period and the sixth group has three photodiodes being configured to have an exposure time period shorter than the first exposure time period,
the seventh group has three photodiodes being configured to have the first exposure time period and the eighth group has four photodiodes being configured to have an exposure time period shorter than the first exposure time period,
the number of photodiodes in each of the first, second, third, fifth, sixth, and seventh groups of pixels is less than the number of photodiodes in each of the fourth and eighth groups of pixels,
the second unit pixel is disposed directly adjacent to the first unit pixel in a first direction,
the third unit pixel is disposed directly adjacent to the second unit pixel in a second direction perpendicular to the first direction,
the fourth unit pixel is disposed directly adjacent to the first unit pixel in the first direction,
the first to fourth unit pixels are arranged in a clockwise direction, the three photodiodes in the first group are disposed with a first photodiode on the first row, a second photodiode on the second row, and a third photodiode on the third rows, the three photodiodes in the fifth group are disposed with a fourth photodiode on the fourth row, a fifth photodiode on the fifth row, and a sixth photodiode on the sixth row, and each of the first to fourth unit pixels has at least three microlens.

2. The image sensor of claim 1, wherein among a plurality of photodiodes included in each of the first unit pixel, the second unit pixel, the third unit pixel, and the fourth unit pixel, a plurality of photodiodes continuing in the second direction share one floating diffusion node.

3. The image sensor of claim 1, wherein a first photodiode in the second group disposed in the first row is disposed directly adjacent to a first photodiode in the fourth group disposed in the first row in the first direction, and wherein a first photodiode in the first group disposed in the second row is disposed directly adjacent to a first photodiode in the third group disposed in the second row in the first direction.

4. The image sensor of claim 1, wherein a first photodiode in the eighth group is disposed directly adjacent to a first photodiode in the sixth group in the first direction, and wherein a first photodiode in the seventh group is disposed directly adjacent to a first photodiode in the fifth group in the first direction.

5. The image sensor of claim 2, wherein a first photodiode in the second group disposed in the first row is disposed directly adjacent to a first photodiode in the fourth group disposed in the first row in the first direction, and wherein a first photodiode in the first group disposed in the second row is disposed directly adjacent to one of photodiodes in the third group disposed in the second row in the first direction.

6. The image sensor of claim 3, wherein the four photodiodes in the eighth group of pixels are disposed on the fourth and the sixth rows.

7. The image sensor of claim 5, wherein the four photodiodes in the fourth group are disposed on the first and the third rows.

8. The image sensor of claim 7, wherein the four photodiodes in the eighth group are disposed on the fourth and the sixth rows.

9. The image sensor of claim 8, wherein the three photodiodes in the second group are disposed on the first and the third rows.

10. The image sensor of claim 9, wherein two of photodiodes in the second group disposed in the third row are disposed directly adjacent to each other in the first direction.

* * * * *